(12) United States Patent
Alarcon Camacho et al.

(10) Patent No.: US 9,238,788 B2
(45) Date of Patent: Jan. 19, 2016

(54) METHOD TO STABILIZE BEER FOAM

(75) Inventors: John Gabriel Alarcon Camacho, Vina del Mar (CL); Javier Ignacio Sainz Lobo, Vina del Mar (CL)

(73) Assignees: Universidad Mayor, Santiago (CL); Natural Response S.A., Quilpue (CL)

( * ) Notice: Subject to any disclaimer, the term of this patent is extended or adjusted under 35 U.S.C. 154(b) by 530 days.

(21) Appl. No.: 12/504,360

(22) Filed: Jul. 16, 2009

(65) Prior Publication Data
US 2010/0021583 A1     Jan. 28, 2010

(30) Foreign Application Priority Data
Jul. 25, 2008   (CL) .................................. 2189-2008

(51) Int. Cl.
| | |
|---|---|
| A23L 1/212 | (2006.01) |
| A23L 2/40 | (2006.01) |
| C12C 5/02 | (2006.01) |
| A23L 1/28 | (2006.01) |
| A23L 1/20 | (2006.01) |

(52) U.S. Cl.
CPC ........................................ *C12C 5/02* (2013.01)

(58) Field of Classification Search
USPC ............................................................ 426/52
See application file for complete search history.

(56) References Cited

U.S. PATENT DOCUMENTS

| | | | | |
|---|---|---|---|---|
| 3,099,563 | A * | 7/1963 | Smith ............................ | 426/384 |
| 4,355,110 | A * | 10/1982 | Line et al. ..................... | 435/210 |
| 4,610,888 | A | 9/1986 | Teng et al. | |
| 4,882,186 | A | 11/1989 | Owades | |
| 4,904,484 | A * | 2/1990 | Small et al. ..................... | 426/45 |
| 5,190,778 | A | 3/1993 | Clare et al. | |
| 5,196,220 | A | 3/1993 | Clare et al. | |
| 6,910,663 | B1 | 6/2005 | Wubben et al. | |
| 2003/0194477 | A1 * | 10/2003 | Rehmanji et al. ............ | 426/592 |
| 2007/0065555 | A1 * | 3/2007 | Soane et al. .................. | 426/564 |

FOREIGN PATENT DOCUMENTS

| | | |
|---|---|---|
| EP | 0 458 613 | 11/1991 |
| EP | 0 460 830 | 12/1991 |
| WO | 96/04363 | 2/1996 |

OTHER PUBLICATIONS

Martin et al., Quality Control of Commercial Quillaja (Quillaja Saponaria Molina) Extracts by Reverse Phase HPLC, J. Sci. Food. Agric. 80:2063-2068 (Martin).*
Kashyap, et al., Applications of Pectinases in the Commercial Sector: A Review, Bioresource Technology 77 (2001) 215-227 (Kashyap).*
Resnik, Quilllaia Extracts, Type 1 and 2, Chemical and Technical Assessment, 61st JECFA, 2004.*
O'Neil, Unique Ingredients: Maltodextrin, published Jan. 8, 2006 12:26 PM accessed at http://www.artofdrink.com/2006/01/unique-ingredients-maltodextrin.php.*
Marchylo, et al., "Identification of Canadian Barley Cultivars by Reversed-Phase High-Performance Liquid Chromatography", Cereal Chem. 61(4), 1984, pp. 295-301.

* cited by examiner

*Primary Examiner* — D. Lawrence Tarazano
*Assistant Examiner* — Philip Dubois
(74) *Attorney, Agent, or Firm* — Hamre, Schumann, Mueller & Larson, P.C.

(57) ABSTRACT

Method for producing extract of *Quillaja saponaria* Molina saponins comprising the treatment of a commercial product of saponins from *Quillaja saponaria* Molina with an enzymatic pool of pectinase, protease, glycosidases and hemicellulitic enzymes, the filtering and the mixing with co-adjuvants, and the use of this extract to stabilize beer foam.

6 Claims, 5 Drawing Sheets

METHOD TO STABILIZE BEER FOAM

FIELD OF APPLICATION

The present invention relates to the use of saponin from *Quillaja saponaria*, pure or with mixtures of these oligosaccharides and/or polyols as additives in the beer industry to improve the stability and quality of beer foam without affecting the colloidal stability of it.

STATE OF THE TECHNIQUE

Beer is a beverage obtained by alcoholic fermentation, using a selected yeast, grains of barley or other grains, which is flavored with hops and subjected to a cooking process. After filtering the beer is to be packaged in bottles, little bottles, cans or barrels, before the addition of additives.

The foam in beer is a feature highly valued by consumers because it is associated with product quality. Foam formation in beer is due to the presence of CO2 gas that escapes to the surface and creates tiny bubbles that are stabilized by proteins. These proteins are present in a natural course of the fermentation process, they cause side effects such as turbidity of beer in some cases even leading to precipitation of protein complexes. This is why great efforts are made to remove proteins to achieve a transparent and clear beer, but this usually translates into a very unstable foam that quickly disappears.

The quality of the foam in beer is negatively affected not only by the unit operations of the normal manufacturing processes such as clarification, filtration and enzymatic hydrolysis used to enhance the colloidal stability of beer, but also by poor protein quality of malta. In addition, many beers are manufactured from mixtures of barley and other cereals (like rice) decreasing its foaming capacity. To improve the quality of the foam usually are used as adjuvants co-propylene glycol alginate (PGA. United States Patent Application 20030194477), pectin (U.S. Pat. No. 6,910,663, 2005, European Patent EP0772675), "gellam gum" (U.S. Pat. Nos. 5,190,778 and 5,196,220. European Patent EP0460830 and European Patent EP0458613) and/or pre-isomerized hop. It is also used addition of gas nitrogen and/or air (U.S. Pat. No. 4,610,888). The PGA, the pectins and the gellan gum improve the quality of foam in the beer (or malt beverages), however, the dosage is difficult due to its high viscosity and sometimes affect the colloidal stability due to the low solubility of some polysaccharide in alcoholic matrices such as beer. Moreover, the hops is unstable decreasing their foaming ability in the time and sometimes affecting the appearance and taste of beer. The American patent (U.S. Pat. No. 4,882,186) includes ginseng extract in the malting process. The extract contains saponins and is added in the malting process. This patent is not specific to the active component or the purification of the extract used. This invention describes a purified *Quillaja* product helped with polyols, inulin, modified starch or oligosaccharides, which improve the quality of foam in beer without affecting their colloidal stability. The product is easy to dose and can be used in beer with protein matrix of different polarity and quality.

The extracts of *Quillaja saponaria* Molina have been transformed into process products valued for its high standards and active composition and not only for its quality of natural extracts, the latter being a critical feature for its commercial success.

Although the extracts of *Quillaja saponaria* Molina have been used for a long time as foaming in carbonated beverages, these have not been successful as a foaming for alcoholic drinks, mainly due to the low purity of the products on the market and its poor standardization regarding the contents of impurities. For example, much of the extracts of *Quillaja* of low purification contain high content of polyphenols (between 6-8% of solids) and polysaccharides. These two components generate colloidal instability since they tend to react with proteins and generate precipitates during the storage of beer. On the other hand, the saponins in the presence of proteins produce competitive adsorption to the iterfase generating in most cases inestability in the foam. This adsorption is different depending on the type of protein and its hydrophobicity and can be modulated by an auxiliary intervening to change the form of protein/saponin adsorption.

The product of this invention is an extract from *Quillaja saponaria* Molina stabilized and highly standardized in their purity of *Quillaja* saponins mixed with oligosaccharides (malto-dextrin, lactose, etc.) and/or polyols (sorbitol, maltitol, etc.), mixture of these components generates a positive synergy in the quality of beer foam. The extract used is highly purified in saponins of *Quillaja* and has a purification process which reduces the concentration of components such as polyphenols and polysaccharides that affect the colloidal stability of beer.

Benefits of the Implementation

Existing products to improve the quality of beer foam are difficult to measure (PGA, gellam gum and pectin), they do not stabilice beer foam with proteinic special features, create colloidal instability (PGA, gellan gum, pectin) or degrade in the storage of beer (case of pre-isomerized hop). The product used in this invention is easily dosaged, stabilizes the foam in beer with different protein characteristics, no colloidal instability or degrade is produced during storage of beer.

The extracts of *Quillaja saponaria* Molina traditionally used as foaming agents in soft drinks are not stable in alcoholic matrices and precipitate over time. The present invention stabilizes the quillay extracts through an enzymatic treatment which allows them to be stable in alcoholic matrices such as beer. Surfactants such as saponins of *Quillaja* adsorbs rapidly to the air-water interface and cause the foam being stable to collapse. In the presence of certain proteins saponins may have a synergistic effect or otherwise causing a competitive adsorption that affects the stability of the foam. On the other hand, oligosaccharides slow drainage from the surface of the foam to the heart of the solution thus positively affecting the overall stability of the foam. In the case of beer there is a delicate balance between proteins, polyphenols and polysaccharides, this balance can be affected by the presence of products of *quillaja* mainly rich in saponins. Depending on the concentrations of the saponins employed the new equilibrium could generate an increase or decrease the foam stability in beer.

This application provides a method for stabilizing beer foam using products rich in saponins of *Quillaja*, alone or aided by oligosaccharides and/or polyols.

All the samples presented in FIGS. 7 to 10 were served with 3.5 bar pressure of $CO_2$. Pictures after 5 minutes of serving beer.

BRIEF DESCRIPTION OF THE INVENTION

Product to stabilize beer foam having as active component saponins of *Quillaja saponaria* Molina alone or helped with purified oligosaccharides (lactose and/or maltodextrin among others), inulin and/or polyols (maltitol, sorbitol, etc). The saponin extract is purified with an enzymatic process to reduce components that are incompatible with the brewer matrix (eg polysaccharides, proteins). The purification process is the stabilization of a commercial extract of *Quillaja saponaria* Molina (QL-Ultra, Natural Response, Chile) that contains more than 190 g/kg of solid *Quillaja* of which 2-6% are polyphenols, 10-16% are polysaccharides and more than 65% are of *Quillaja* saponins. The commercial product (QL Ultra) is treated with a enzymatic pool of pectinase, protease, glucosidase and hemicellulitic enzymes.

Subsequently filtered by a filter of plates and frames is carried on. The purified extract obtained is mixed with adjuvants such as potato maltodextrin, corn maltodextrin, modified starch, lactose, inulin, sorbitol and/or maltitol. The ratio of mixture ranges goes between 5-100% of solids from the purified extract of saponin from *Quillaja* and 0-95% of adjuvant. The adjuvant proportions used in the product depend on the protein matrix from the beer. The product is added to the beer prior to filtration or to put into a container in doses ranging from 30-1000 ppm, preferably 30-200 ppm.

Example 1

Production of Extract a) Contact the commercial QL Ultra (*Quillaja* Ultra Liquid, Natural Response, Chile) with an enzymatic pool of pectinase, protease, glucosidase and hemicellulitic enzymes.

b) Filter the product obtained from step a) adjusted to 21.5° Brix (approximately c) Mix the extract obtained in step b) (referred to as "purified extract of *Quillaja* saponin") with an adjuvant, which can be potato maltodextrin, corn maltodextrin, lactose, inulin, sorbitol and/or maltitol in a ratio 5-100% of solids from the purified extract of saponin from *Quillaja* and 0-95% of co-adjuvant.

d) Set the product to 21.5° Brix, or bring it to 30° Brix to further spray drying.

Example 2

Figure 1:
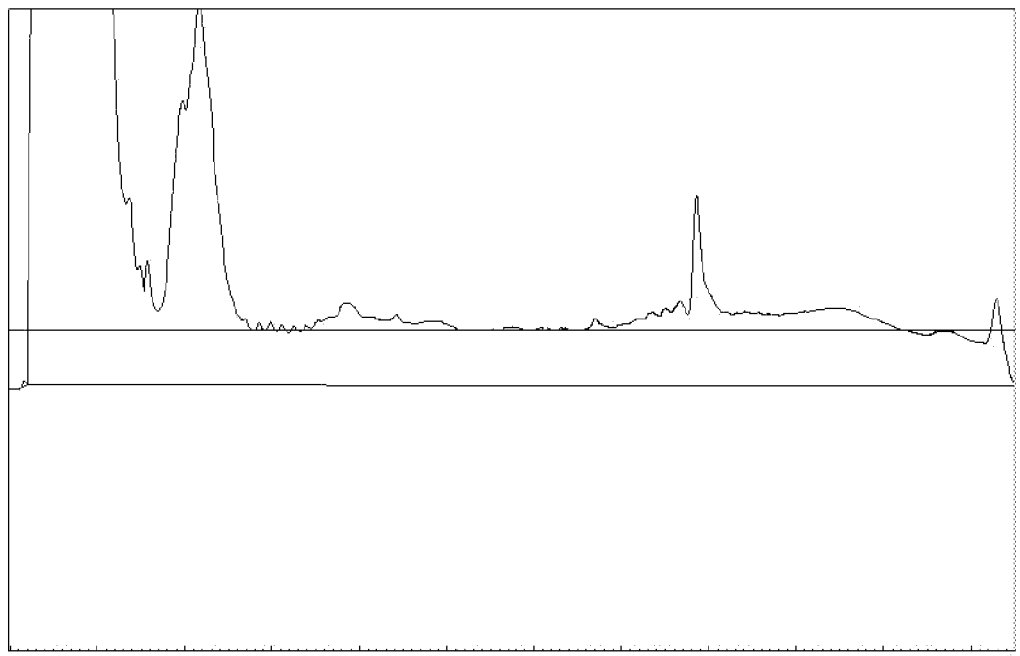
FIGS. 1 through 6 show profiles RP-HPLC as described by Marchylo and Kruger, (1984) to characterize the protein profile of samples of beer to consider.

Beer number 1 (commertial beer defined by its protein profile by HPLC according to FIG. 1) is bottled by adding product prepared in Example 1. The product contains no co-adjuvant and purified *Quillaja* extract only on those components that cause colloidal instability in beer. The beer was characterized by its protein content (Lowry method) yielding 4.4 g/L of most of which proteins are hydrophilic (See FIG. 1. Analysis of RP-HPLC according Marchylo and Kruger, 1984). The dose of the product used was between 33-200 ppm. Foam stability was measured by using the Nibem method obtaining a better beer foam stability with the product to stabilize beer foam vs. beer alone. The Nibem method is to pour the beer with $CO_2$ pressure to a clean glass. Subsequently the time it takes to get off the foam 30 mm. is measured. Table 1 shows the results.

TABLE 1

Stability of foam for different concentrations of product number 1 beer

| Product Concentration (ppm) | Foam Stability (s) | Product |
|---|---|---|
| 0 | 145 | 100% purified extract of *Quillaja saponin* |
| 33 | 173 | 100% purified extract of *Quillaja saponin* |
| 50 | 200 | 100% purified extract of *Quillaja saponin* |
| 100 | 240 | 100% purified extract of *Quillaja saponin* |
| 150 | 244 | 100% purified extract of *Quillaja saponin* |
| 200 | 274 | 100% purified extract of *Quillaja saponin* |

The purified extract of *Quillaja* saponin did not affect the colloidal stability of beer with respect to beer in normal storage conditions without additive during 6 months. Beers that are dosed with QL Ultra (NR, Chile) showed a slight tendency to form turbidity in beer during storage.

Example 3

Figure 2:
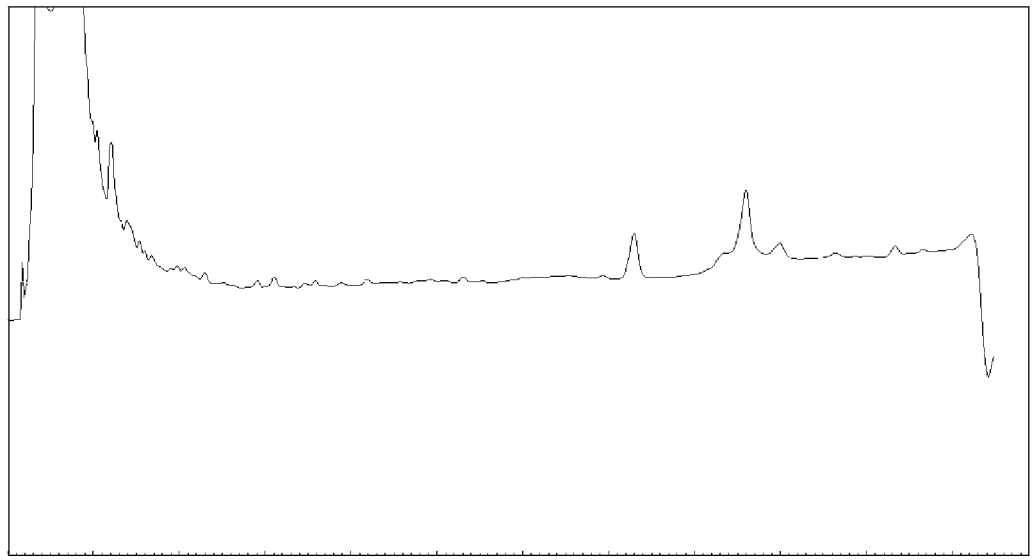

The product obtained in Example 1 was mixed with lactose or maltodextrin and spray dried yielding the final product with 30% solids of purified *Quillaja* extract and 70% of lactose or maltodextrin. Beer number 2 (commercial beer defined by its protein profile by HPLC according to FIG. 2) is packaged adding the powder at different doses. The beer was characterized by its protein content (Lowry method) yielding 3.46 g/L and characterized by the presence of low-hidrophylic protein and a higher content of hydrophobic proteins (See FIG. 2. Analysis of RP-HPLC as Marchylo and Kruger, 1984). The product was used in doses between 33-500 ppm, preferably 100-200 ppm. Foam was measured using the Nibem method obtaining a better beer foam stability for beer containing the extract of *Quillaja* helped with maltodextrin or lactose compared to beer alone or beer with single-dose Ultra QL between 10-500 ppm. The product QL Ultra contains only *Quillaja* solids. Table 2 shows the results.

TABLE 2

Stability of foam for different *Quillaja* extracts with different adjuvant in beer number 2

| Product Concentration (ppm) | Foam Stability (s) | Product (type) |
|---|---|---|
| 0 | 183 | |
| 200 | 204 | 30% extract of purified *Quillaja saponins* and 70% maltodextrin |
| 200 | 205 | 30% extract of purified *Quillaja saponins* and 70% lactose |
| 140 | 185 | Maltodextrin |
| 140 | 186 | Lactose |
| 10 | 168 | QL Ultra |
| 50 | 138 | QL Ultra |
| 200 | 188 | QL Ultra |
| 500 | 174 | QL Ultra |

Example 4

Figure 3:
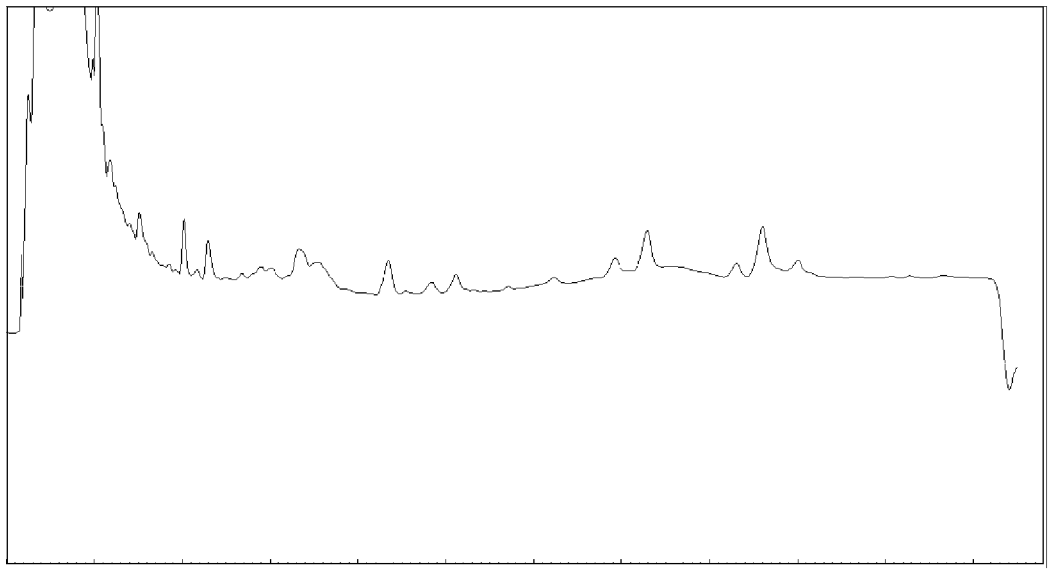

The product obtained in Example 1 was mixed with a mixture of maltitol/lactose/maltodextrin and dried on spray dryer being the final product with 5% solids of purified extract of *Quillaja* and 95% maltitol/lactose/maltodextrin. Beer number 3 (commercial beer defined by its protein profile by HPLC according to FIG. 3) is packed by adding the powder at different doses. The beer was characterized by its protein content (Lowry method) yielding 3.01 g/L and characterized by the presence of similar content of hydrophilic and hydrophobic proteins (See FIG. 3. Analysis of RP-HPLC according to Marchylo and Kruger, 1984). The dose of the product used was between 30-80 ppm. Foam was measured using the Nibem method obtaining a better foam stability for beers containing the *Quillaja* extract helped with maltitol/maltodextrin/lactose compared to pure beer or beer with Ultra QL dose between 5-200 ppm. Table 3 shows the results.

TABLE 3

Stability of foam for different concentrations of product in beer producer number 3

| Product (ppm) | Stability (seg) | Product (type) |
| --- | --- | --- |
| 0 | 242 | |
| 38 | 245 | 5% extract purified *Quillaja saponins* with 95% of a of maltitol/maltodextrin/lactose mixture |
| 76 | 320 | 5% extract purified *Quillaja saponins* with 95% of a of maltitol/maltodextrin/lactose mixture |
| 5 | 216 | QL Ultra |
| 50 | 144 | QL Ultra |
| 200 | 140 | QL Ultra |

Example 5

Figure 4:
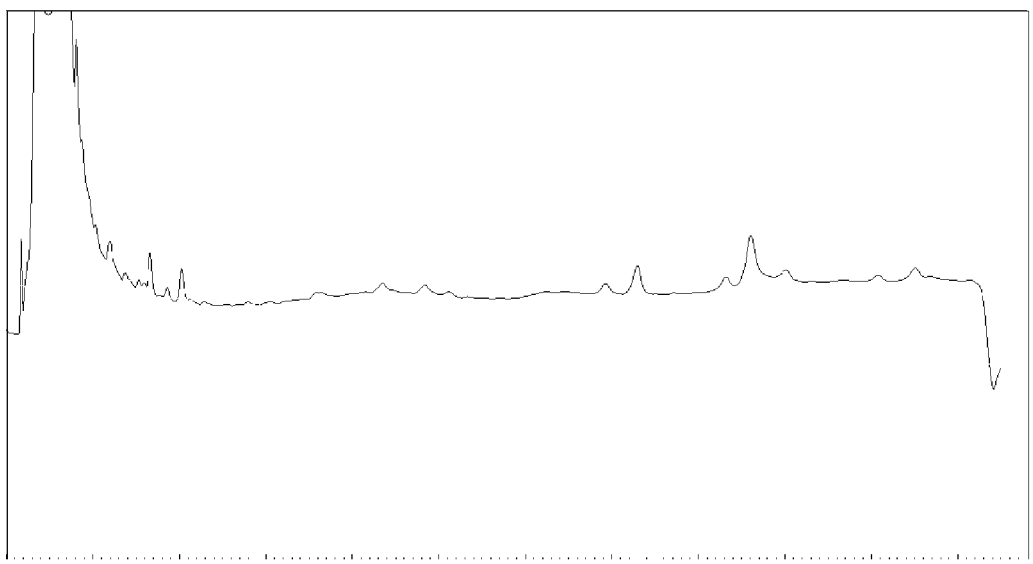

The product obtained in Example 1 was mixed with a mixture of maltitol/lactose/maltodextrin and dried on a spray dryer being the final product with 5% solids of purified extract of *Quillaja* and 95% maltitol/lactose/maltodextrin. Beer number 4 (commercial beer defined by its protein profile by HPLC according to FIG. 4) is packaged adding the powder in different doses. The beer was characterized by its protein content (Lowry method) yielding 2.42 g/L and characterized by the presence of similar content of hydrophilic and hydrophobic proteins (See FIG. 4. Analysis of RP-HPLC according Marchylo and Kruger, 1984). The dose of the product used was between 20-80 ppm. Foam was measured using the Nibem method obtaining a better stability of foam in beer containing the extract of *Quillaja* helped with maltitol/maltodextrin/lactose compared to pure beer or beer with QL Ultra in doses between 10-20 ppm. Table 4 shows the results.

TABLE 4

Stability of foam for different concentrations of product in beer number 4

| Product (ppm) | Stability (seg) | Product (type) |
| --- | --- | --- |
| 0 | 244 | |
| 20 | 275 | 5% purified extract of *quillaja saponins* with 95% of maltitol/maltodextrin/lactose mixture |
| 40 | 280 | 5% purified extract of *quillaja saponins* with 95% of maltitol/maltodextrin/lactose mixture |
| 60 | 205 | 5% purified extract of *quillaja saponins* with 95% of maltitol/maltodextrin/lactose mixture |
| 80 | 230 | 5% purified extract of *quillaja saponins* with 95% of maltitol/maltodextrin/lactose mixture |
| 10 | 170 | QL Ultra |
| 20 | 215 | QL Ultra |

Example 6

Figure 5:
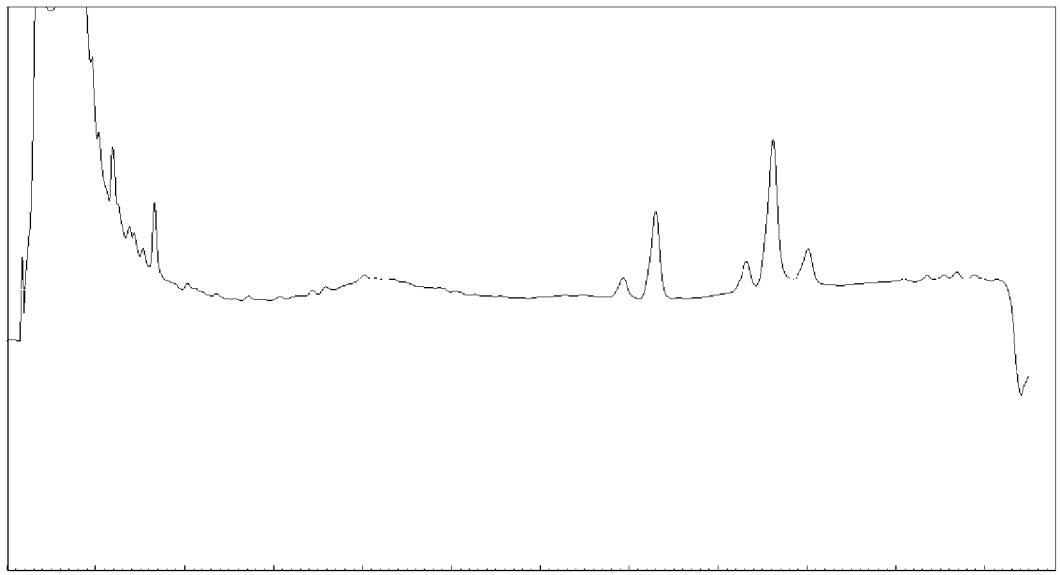

The product obtained in Example 1 was mixed with a mixture of maltitol/lactose/maltodextrin and dried on a spray dryer being the final product with 5% solids of purified *quillaja* extract and 95% matitol/lactose/maltodextrin. Beer number 5 (commercial beer defined by its protein profile by HPLC according to FIG. 5) was packaged adding the powder in different doses. The beer was characterized by its protein content (Lowry method) yielding 3.64 g/L and characterized by the presence of less hydrophilic protein with respect to the hydrophobic ones (See FIG. 5. Analysis of RP-HPLC according Marchylo and Kruger, 1984). The dose of product used was 20-40 ppm. Foam was measured using the Nibem method obtaining a better foam stability of the beer with the stabilizing foam product to stabilize beer foam vs. Beer alone. Table 5 shows the results.

TABLE 5

Stability of foam for different concentrations of product in beer number 5
Product (ppm) Stability (s) Product (sort)

| Product (ppm) | Stability (seg) | Product (type) |
| --- | --- | --- |
| 0 | 270 | |
| 20 | 345 | 5% purified extract of *quillaja saponins* with 95% of maltitol/maltodextrin/lactose mixture |
| 40 | 241 | 5% purified extract of *quillaja saponins* with 95% of maltitol/maltodextrin/lactose mixture |

Example 7

Figure 6:
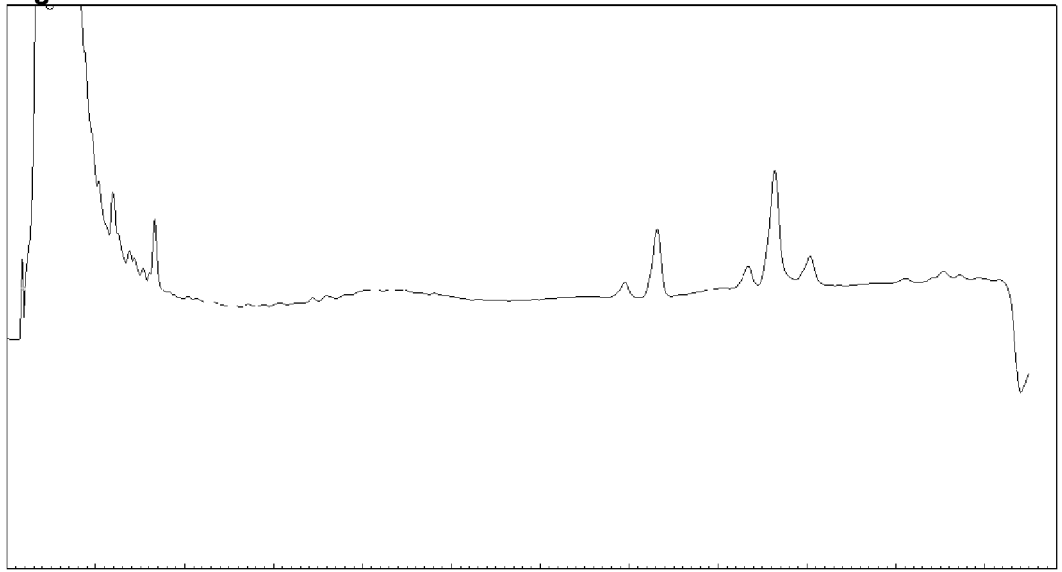
Figure 7:
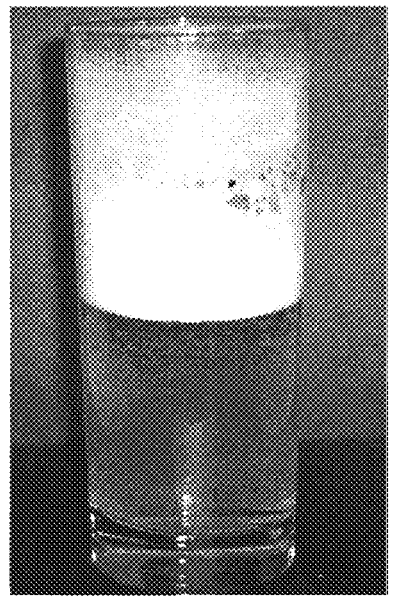
FIG. 7 shows a representative image of quality assessment of Cerveza beer with no additives.
Figure 8:
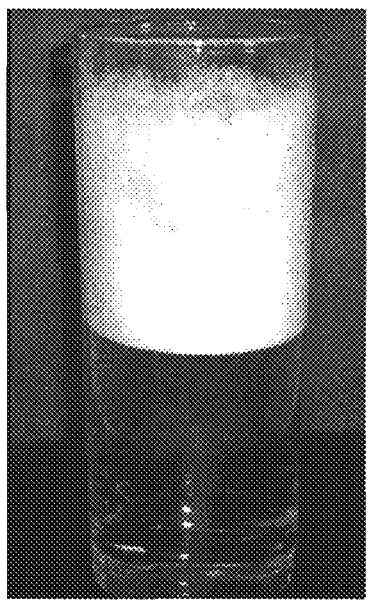
FIG. 8 shows a representative image of quality assessment of beer with a product composed of 70% maltodextrin 30% of purified extract of *Quillaja*
Figure 9:
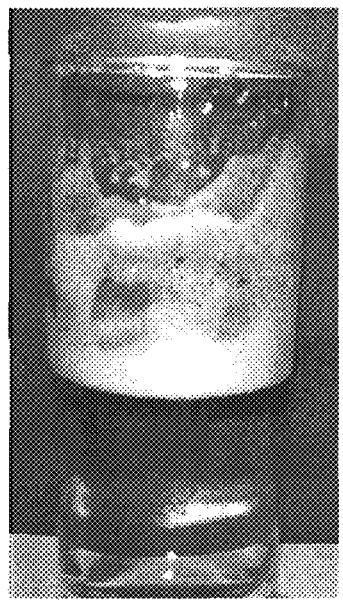
FIG. 9 shows a representative image of quality assessment of beer with the commercial quillay extract Ultra QL (Natural Response, Chile)
Figure 10:
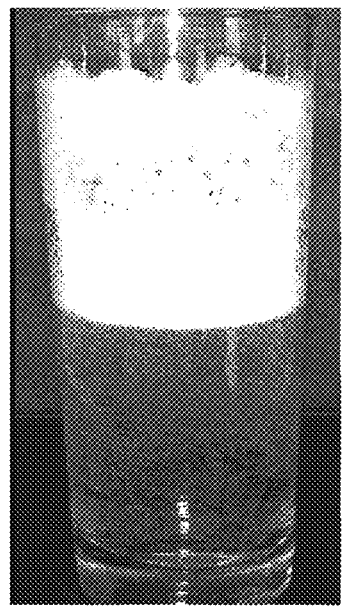
FIG. 10 shows a representative image of quality assessment of beer with maltodextrin.

The product obtained in Example 1 was mixed with a mixture of maltitol/lactose/maltodextrin and dried on a spray dryer being the final product with 5% solids of purified extract of *Quillaja* and 95% maltitol/lactose/maltodextrin. Beer number 6 (commercial beer defined by its protein profile by HPLC according to FIG. 6) was packaged by adding the powder in different doses. The beer was characterized by its protein content (Lowry method) yielding 3.00 g/L and beeing characterized by the presence of less hydrophilic protein with respect to the hydrophobic ones (See FIG. 6. Analysis of RP-HPLC according Marchylo and Kruger, 1984). The dose of the product used was between 20-60 ppm. Foam was measured by using the method of Nibem (measuring the time it takes 30 mm to lower the foam) obtaining a better stability in the beer foam with a product to stabilize beer foam vs. Beer alone. Table 6 shows the results.

TABLE 6

Stability of foam for different concentrations of product in beer number 6

| Product (ppm) | Stability (seg) | Product (type) |
|---|---|---|
| 0 | 260 | |
| 20 | 219 | 5% purified extract of quillaja saponins with 95% of maltitol/maltodextrin/lactose mixture |
| 40 | 269 | 5% purified extract of quillaja saponins with 95% of maltitol/maltodextrin/lactose mixture |
| 60 | 330 | 5% purified extract of quillaja saponins with 95% of maltitol/maltodextrin/lactose mixture |

Example 8

The colloidal stability of beer in Examples 2-7 was measured by accelerated and no accelerated tests and it was found that the colloidal stability of beer is not affected by the addition of the product of purified extract of saponin/adjuvant. The test for measuring colloidal stability consists in turbidity measurements and observation of appearance of precipitates in beer stored at 5° C., room temperature and 45° C. for 6 months.

Example 9

To valuate the quality of the foam, was served the beer used in example 3 with the product contained 70% maltodextrin 30% of purified extract of *Quillaja* from Example 1, with QL Ultra, with maltodextrin and without additives. The beer was poured with a pressure of 3.5 bar of CO2. The quality of beer foam with extracts of *Quillaja* helped with maltodextrin presents a more compact and more stable foam than the beer with no additives or beer with maltodextrin only (see FIG. 7 for beer with no additives, 8 for beer with the product containing maltodextrin and *quillaja* extract, 9 for beer with only commercial *quillaja* extract QL Ultra and 10 for beer with maltodextrin). Beer with commercial Ultra QL extract has a lower quality foam (FIG. 9) and beer stability than the beer without additive (see FIG. 7). The QL Ultra is a commercial product that contains only *Quillaja* solids.

The invention claimed is:

1. A method of stabilizing a foam that is derived from beer, comprising:
    adding a co-adjuvant to a purified extract of *Quilaja saponaria* Molina saponins so as to obtain an extract mixture, adding the extract mixture to the beer so as to obtain a beer mixture, and
    forming the foam from the beer mixture,
    wherein the co-adjuvant comprises an oligosaccharide and the purified extract of *Quilaja saponaria* Molina saponins is obtained by treating *Quilaja saponaria* Molina saponins with a mixture of enzymes comprising a pectinase, a glucosidase and a hemicellulase, and
    wherein the oligosaccharide is at least one selected from the group consisting of maltodextrin, lactose and inulin, and wherein the co-adjuvant is added an amount effective for increasing the stability of a foam that is derived from beer to which the mixture has been added as compared to the stability of a foam that is derived from beer to which only *Quilaja saponaria* Molina saponins has been added.

2. The method of claim 1, wherein the step of forming the foam includes dispensing the beer mixture with a CO2 pressure of 3.5 bar.

3. The method of claim 1, wherein the stability of a foam that is derived from beer is measured using a Nibem stability test where a foam collapse time over a distance of 30 mm is measured.

4. The method of claim 1, wherein the effective amount is 70-95% of the mixture.

5. The method of claim 1, wherein the maltodextrin is potato maltodextrin or corn maltodextrin.

6. The method of claim 1, wherein the co-adjuvant further comprises a polyol.

* * * * *